US012766887B2

(12) United States Patent
Forte et al.

(10) Patent No.: US 12,766,887 B2
(45) Date of Patent: Oct. 20, 2026

(54) TBR PNEUMATIC TIRE

(71) Applicant: Bridgestone Europe NV/SA [BE/BE], Zaventem (BE)

(72) Inventors: Gianluca Forte, Rome (IT); Luca Spiri, Rome (IT); Valeria Riccio, Rome (IT); Brenda Cecilia Barrios Perez, Rome (IT)

(73) Assignee: Bridgestone Europe, NV/SA, Zaventem (BE)

( * ) Notice: Subject to any disclaimer, the term of this patent is extended or adjusted under 35 U.S.C. 154(b) by 141 days.

(21) Appl. No.: 18/034,413

(22) PCT Filed: Oct. 28, 2021

(86) PCT No.: PCT/EP2021/079969

§ 371 (c)(1),
(2) Date: Apr. 28, 2023

(87) PCT Pub. No.: WO2022/090387

PCT Pub. Date: May 5, 2022

(65) Prior Publication Data

US 2024/0017571 A1 Jan. 18, 2024

(30) Foreign Application Priority Data

Oct. 30, 2020 (IT) ........................ 102020000025834

(51) Int. Cl.
*B60C 9/22* (2006.01)
*B60C 1/00* (2006.01)
(Continued)

(52) U.S. Cl.
CPC .............. *B60C 9/22* (2013.01); *B60C 1/0016* (2013.01); *B60C 9/2006* (2013.01); *C08K 3/013* (2018.01);
(Continued)

(58) Field of Classification Search
CPC .......................... B60C 1/0016; B60C 11/0008
See application file for complete search history.

(56) References Cited

U.S. PATENT DOCUMENTS

2013/0075009 A1 3/2013 Miyazaki
2016/0152082 A1 6/2016 Wang et al.

FOREIGN PATENT DOCUMENTS

CN 102574425 A 7/2012
CN 104321207 A 1/2015
(Continued)

OTHER PUBLICATIONS

PCT International Search Report, Jan. 17, 2022, 3 pages.
Chinese search report, corresponding application No. CN202180074032A, Jul. 22, 2025, 3 pages.

*Primary Examiner* — Justin R Fischer
(74) *Attorney, Agent, or Firm* — Patterson Intellectual Property Law, PC

(57) ABSTRACT

A TBR pneumatic tyre comprising a carcass, a tread and at least one "high elongation belt" formed from a single cord with a laying angle ε of between 0.03° and 0.1° and comprising an axial extension CW wherein the ratio thereof to the axial extension of said tread (TW/CW) is between 1.1 and 1.4. The tread is made of a rubber compound comprising a cross-linkable unsaturated chain polymeric base comprising at least 50% by weight of natural rubber (NR), a mixture of fillers comprising (a) a carbon black having a surface area of between 99 and 170 m2/g and with a structure of greater than 120 cc/100 g, (b) a first silica having a surface area of less than 100 m2/g, and (c) a second silica having a surface area of more than 190 m2/g.

13 Claims, 1 Drawing Sheet

(51) Int. Cl.
*B60C 9/20* (2006.01)
*C08K 3/013* (2018.01)
*C08K 3/36* (2006.01)
*C08L 7/00* (2006.01)

(52) U.S. Cl.
CPC .................. *C08K 3/36* (2013.01); *C08L 7/00* (2013.01); *B60C 2009/2093* (2013.01); *B60C 2200/06* (2013.01); *C08K 2201/006* (2013.01); *C08L 2555/54* (2013.01)

(56) References Cited

FOREIGN PATENT DOCUMENTS

| | | | | |
|---|---|---|---|---|
| JP | 2011016337 | A | | 1/2011 |
| JP | 4865274 | | * | 2/2012 |
| JP | 2015124371 | A | | 7/2015 |
| JP | 2018-168300 | | * | 11/2018 |
| WO | 2020012294 | A1 | | 1/2020 |

* cited by examiner

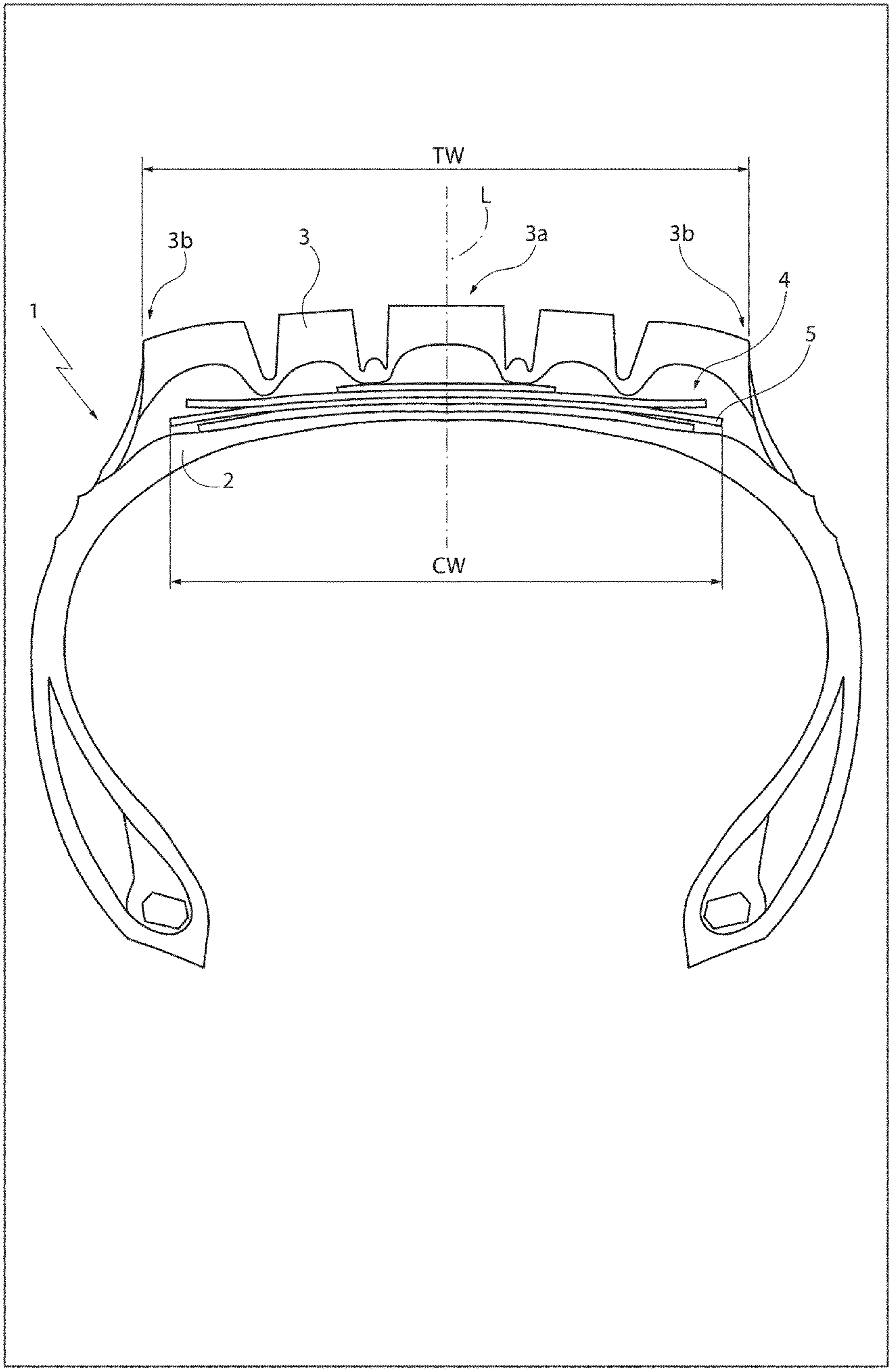
TW
L
3b
3
3a
3b
4
1
5
2
CW

TBR PNEUMATIC TIRE

The present invention relates to a TBR pneumatic tire. The abbreviation "TBR" is an acronym for the English wording "Truck & Bus Radial Tire".

For some time now, also in the field of TBR pneumatic tires, research has partly been aimed at improving the performance thereof in terms of rolling resistance. Lately, such a requirement is also dictated by a number of international regulations which impose a significant reduction in fuel consumption and in the resulting emissions of $CO_2$ into the environment.

As is known to persons skilled in the art, a solution for improving the rolling resistance of a pneumatic tire tread relates to an increase in the amount of silica within the relative rubber compound.

Although an improvement is obtained in terms of rolling resistance, an increase in the amount of silica within the compound necessarily leads to a decrease in wear resistance.

As can immediately be seen, for TBR pneumatic tires, wear resistance is one of the main requirements for the efficiency thereof. For TBR pneumatic tires, any deterioration cannot possibly be accepted in terms of wear resistance by virtue of an improvement in terms of rolling resistance.

The tread portions wherein wear phenomena are most present in TBR pneumatic tires are the shoulders.

This type of wear derives both from different rigidity between the center and shoulders of the tread and from the lateral force to which the pneumatic tire is subjected during rolling. In the pneumatic tire industry, this lateral force is referred to by the English expression "ply steer" and is generated by asymmetries present within the carcass of the pneumatic tire.

Wearing of the shoulders, in addition to causing a noise problem, may result in the replacement of the pneumatic tire, despite the central part of the tread still being substantially intact.

The need was therefore felt to have a solution capable of implementing the production of TBR pneumatic tires that would present improved rolling resistance without, for this reason, resulting in deterioration in terms of tread wear.

The inventors of the present invention have implemented a solution that, by intervening both on the belt pack and on the composition of the tread, is able to satisfy the requirement mentioned above.

It has long been known that it is possible to use belts marked with the wording "high elongation belt" in place of traditional belts marked with the wording "wavy belt".

The expression "high elongation belt" refers to a belt that is characterized by a modulus of rigidity that is variable as a function of deformation. In particular, the modulus of rigidity is low for a minimal force and high for a greater force. This allows the cord to expand during the vulcanization process and to ensure a high modulus of rigidity during operation.

For greater clarity, a "high elongation belt" is a belt that incorporates a cord with a modulus of rigidity which varies from about 3,000 MPa (low modulus, from 0 to about 2% deformation or elongation) to 125,000 MPa (high modulus, for a deformation of greater than about 2%).

Currently, a plurality of known types of "high elongation belt" is available.

The application of a "high elongation belt" offers important advantages in comparison to traditional ("wavy belt") construction.

In this respect, it should be remembered that those belts which are defined as "wavy belt" are applied as a strip of a plurality of calendered cords (preferably nine cords).

The application of this strip necessarily anticipates a significant "laying angle" or "tread belt angle," a, which is the angle between the cord and the longitudinal plane of symmetry L. Furthermore, as is known, the edges of such a strip must be protected by the overlapping of a further belt strip. As is known to a person skilled in the art, the greater the angle $\vartheta$ and the larger the additional protective belt strip, the greater will be the asymmetry of the pneumatic tire and, therefore, the greater will be the "ply steer" to which the pneumatic tire is subjected.

In contrast, insofar as a "high elongation belt" is applied as a single cord, it is possible to arrange it with an extremely small angle $\vartheta$ and, moreover, without the need to add a coating in order to protect the free edge of the strip. All of this translates to lower asymmetry of the belt pack and, therefore, to less "ply steer".

Another advantage of using the "high elongation belt" compared to the "wavy belt" resides in the possibility of its extending axially almost up to the tread shoulders. Conversely, if the "wavy belt" were to extend up to the tread shoulders, it would be subject to fatigue loads that would compromise the effectiveness thereof.

In summary, the use of "high elongation belts" with a laying angle $\vartheta$ close to zero and an extension up to the tread shoulders, confers improved wear resistance to the pneumatic tire.

The inventors of the present invention have surprisingly found that the use of a "high elongation belt" in combination with a particular tread composition, in addition to ensuring the expected improvements in terms of wear resistance, also results in a significant improvement in terms of rolling resistance.

As will be described below, an unexpected synergistic effect is verified between the presence of the "high elongation belt" and the particular tread composition.

The object of the present invention is a TBR pneumatic tire comprising a carcass, a tread and at least one "high elongation belt" formed from a single cord with a laying angle $\vartheta$ of between 0.03° and 0.1° and comprising an axial extension CW wherein the ratio of the axial extension of the tread (TW) to the axial extension of the high elongation belt (TW/CW) is between 1.1 and 1.4; said tread being manufactured from a rubber compound comprising a cross-linkable unsaturated chain polymeric base comprising at least 50% by weight of natural rubber (NR), a mixture of fillers comprising silica and carbon black and a vulcanization system; said pneumatic tire being characterized in that said mixture of fillers comprises (a) a carbon black having a surface area of between 99 and 170 $m^2/g$ and with a structure of greater than 120 cc/100 g, (b) a first silica having a surface area of less than 100 $m^2/g$, and (c) a second silica having a surface area greater than 190 $m^2/g$.

Here and hereinafter, the term "cross-linkable unsaturated chain polymeric base" refers to any natural or synthetic non-cross-linked polymer capable of assuming all of the chemical-physical and mechanical characteristics typically assumed by elastomers upon cross-linking (vulcanization) by means of cross-linking agents, for example sulfur.

Here and hereinafter, the term vulcanization system refers to a complex of ingredients comprising at least one cross-linking agent, for example sulfur, and accelerating compounds, which, in the preparation of the compound, are added during a final mixing step and which have the purpose of promoting the vulcanization of the polymeric base.

Preferably, the mixture of fillers comprises (a) 15-40% by weight of said carbon black, (b) 10-35% by weight of said first silica and (c) 40-80% by weight of a second silica having a surface area greater than 190 $m^2/g$.

Preferably, the mixture of fillers comprises (a) 25-35% by weight of said carbon black, (b) 15-25% by weight of said first silica, and (c) 50-60% by weight of said second silica.

Preferably, said carbon black has a surface area of between 120 and 150 $m^2/g$ and with a structure of between 120 and 170 cc/100 g, (b) said first silica has a surface area of between 70 and 100 $m^2/g$, and (c) said second silica having a surface area of between 190 and 250 $m^2/g$.

Preferably, the "high elongation belt" (5) is manufactured from RT (regular Tensile) steel or HT (High Tensile) steel or SHT (Super High Tensile) steel or UHT (Ultra High Tensile) steel.

The following are purely illustrative and non-limiting exemplary embodiments shown with the help of the annexed FIGURE, which illustrates, in section view, a portion of a pneumatic tire according to the present invention.

EXAMPLES

A pneumatic tire according to the present invention is indicated in the entirety thereof with 1 in the FIGURE. The pneumatic tire 1 comprises a carcass 2, a tread 3 and a plurality of belts 4.

The tread comprises a central portion 3*a* and a pair of shoulders 3*b*.

The belts 4 comprise at least one belt 5 of the "high elongation belt" type as defined above. As illustrated in the FIGURE, the belt 5 has an axial extension that meets the requirements defined in the claims.

In particular, the pneumatic tire 1 comprises four belts of which the second, starting from the carcass 2, is a "high elongation belt" 5.

Three tread compounds (A-C) were made to be used for the manufacture of test pneumatic tires wherein properties will be studied in relation to rolling resistance, wear resistance and uneven wear.

The compound A comprises a mixture of fillers which does not satisfy the composition of the present invention, while the B and C compounds comprise a mixture of fillers that does satisfy the composition of the present invention.

Herebelow, the procedure is given for the preparation of the compounds described in the examples. This procedure does not represent a limitation for the present invention.

The term "Intermesh Mixer" refers to a machine for mixing rubber as described and claimed in U.S. Pat. No. 5,368,383.

The term "non-productive mixing step" refers to a mixing step during which the ingredients of the compound, excluding the vulcanization system, are added and mixed with the cross-linkable unsaturated chain polymeric base; while the term "productive mixing step" refers to a mixing step during which the vulcanization system is added and mixed with the mixture under preparation.

Preparation of the Compounds (First Non-Productive Mixing Step)

Before mixing, a first mixing chamber of a 5 liter "Intermesh Mixer" was loaded with the ingredients listed in Tables I and II with the exception of the sulfur, stearic acid and the accelerant, with a fill factor of 60-70%.

This first mixing step was performed while maintaining a temperature of 140° C. for 60 seconds.

(Second Non-Productive Mixing Step)

The mixture of the first step was discharged into a second 5 liter chamber of the "Intermesh" mixer reaching a fill factor of 35-41%.

This second mixing step was performed while maintaining a temperature of 155° C. for 210 seconds.

(Productive Mixing Step)

The mixture obtained from the second non-productive mixing step was discharged into a 2 liter tangential rotor mixer and to it were added sulfur, stearic acid and an accelerant reaching a fill factor equal to 70%.

The mixer was operated at a speed of 20-40 rpm, and the resulting mixture was unloaded upon reaching a temperature of 100-110° C.

Table I shows the compositions in phr of the compounds of the examples.

TABLE I

| | A | B | C |
|---|---|---|---|
| NR | 70 | 70 | 70 |
| SBR | 30 | 30 | 30 |
| Carbon black | 37 | 15 | 18 |
| First silica (VLSA) | — | 20 | 10 |
| Second silica (HSA) | 10 | 23 | 30 |
| Sulfur | 1.2 | 1.2 | 1.2 |
| Stearic acid | 3.5 | 3.5 | 3.5 |
| Accelerant | 2.15 | 2.15 | 2.15 |

NR is a 1,4-cis-polyisoprene rubber of natural origin.

S-SBR is a polymeric base obtained by means of a solution polymerization process with an average molecular weight ranging, respectively, between 800-1500 × $10^3$ and between 500-900 × $10^3$, with a stirene content ranging between 10 and 45% and a vinyl content ranging between 20 and 70%.

The carbon black has a surface area of 138 $m^2/g$.

The first silica (VLSA) has a surface area of 80 $m^2/g$.

The second silica (HSA) has a surface area of 200 $m^2/g$.

The vulcanization accelerant utilized is N-tert-butyl-2-benzothiazyl-sulfenamide (TBBS).

The compounds reported in Table I were used for the construction of five pneumatic tires (I-V). In particular, the pneumatic tires I-IV are comparative examples, while the pneumatic tire V represents a pneumatic tire according to the invention.

In particular, the pneumatic tire I does not comprise a "high elongation belt" and comprises a tread made using a compound wherein the mixture of fillers thereof comprises carbon black and only the silica with the high surface area (compound A); the pneumatic tire II does not comprise a "high elongation belt" and comprises a tread made using a compound wherein the mixture of fillers thereof comprises carbon black, the high surface area silica and the low surface area silica according to the invention, in a ratio different than that according to the invention (compound B); the pneumatic tire III does not comprise a "high elongation belt" and comprises a tread made using a compound wherein the mixture of fillers thereof comprises carbon black, the high surface area silica and the low surface area silica in the ratio according to the invention (compound C); the pneumatic tire IV comprises a "high elongation belt" according to the characteristics of the invention and comprises a tread made using a compound wherein the mixture of fillers thereof comprises carbon black and only the high surface area silica (compound A); the pneumatic tire V comprises a "high elongation belt" according to the characteristics of the invention and comprises a tread made using a compound wherein the mixture of fillers thereof comprises carbon black, the high surface area silica and the low surface area silica in the ratio according to the invention (compound C).

For the pneumatic tires IV and V, the "high elongation belt" was made in applying the cord at a laying angle $\vartheta$ of 0.042.

For the pneumatic tires IV and V, the TW/CW ratio is 1.25.

For the pneumatic tires I-III, the TW/CW ratio (CW in these cases is the extension of the widest belt) is 1.5.

The pneumatic tires I-V were subjected to a series of tests in order to evaluate those properties in relation to rolling resistance, wear resistance and uneven wear.

The rolling resistance was measured according to the R117 standard.

The wear resistance was evaluated using the procedure described below:

The pneumatic tires were mounted on comparable tractors and trailers and subjected to the same operating conditions (for example, the type of road traveled, the number of kilometers traveled and the load).

During the procedure, the depth was recorded of the main grooves of the tread of the pneumatic tire and whether the tread was developing signs of uneven wear such as cupping, depression of the ribs, alternating wear of the wings or wearing of the shoulders.

The data recorded for the wear resistance are the following:

$$WTD=OTD-RTD$$

$$KPM=(KM\ covered)/WTD$$

OTD=Original Tread Depth

RTD=Remaining Tread Depth

KPM is the parameter for classifying the wear amongst the specifications.

In Table II the results relating to the rolling resistance and the wear resistance are expressed in indexed form on the basis of the results obtained in relation to the pneumatic tire I. The greater the reported values, the better the rolling resistance and wear resistance.

The uneven wear was evaluated using a rigid profile shaped according to the shape of the new tread. After using the pneumatic tire, the rigid profile is rested against the tread, and whether or not the tread is still adhering to the rigid profile is evaluated. If, after using the pneumatic tire, the tread is uniformly worn, then the portion in relation to the shoulders of the tread will still adhere to the rigid profile. Conversely, if the tread is worn in an irregular manner, then those portions in relation to the tread shoulders will no longer adhere to the rigid profile.

In Table II the irregular wear values are given in % of missing volume of rubber adhering to the rigid profile in relation to the missing volume of rubber adhering to the rigid profile in the pneumatic tire I used as a reference.

TABLE II

| | I | II | III | IV | V |
|---|---|---|---|---|---|
| Rolling resistance | 100 | 105 | 107 | 101 | 110 |
| Wear resistance | 100 | 60 | 80 | 145 | 145 |
| Uneven wear | 100 | 60 | 70 | 50 | 50 |

As appears evident from the data reported in Table II, the pneumatic tire obtained according to the invention ensures, by means of the combined use of the particular mixture of fillers and of the "high elongation belt", a significant improvement in terms of rolling resistance, wear resistance and uneven wear.

In this respect, it should be noted that there is an unexpected synergistic effect in terms of rolling resistance. In fact, the pneumatic tire of the invention (pneumatic tire V) gives a rolling resistance result that is better than that of the pneumatic tire III despite both using the same compound (Compound C).

In other words, the use of a "high elongation belt" ensures an improvement in terms of wear resistance and in terms of uneven wear and, surprisingly, produces a synergistic effect, with a particular combination of tread compound fillers, in terms of rolling resistance.

In this way it will be possible to manufacture a pneumatic tire with improved rolling resistance without, for this reason, resulting in any worsening of the wear resistance.

The invention claimed is:

1. A truck and bus radial (TBR) pneumatic tire comprising:

a carcass;

a tread; and at least one high elongation belt formed from a single cord with a laying angle $\vartheta$ of between 0.03° and 0.1° and comprising an axial extension, wherein a ratio (TW/CW) of the axial extension of the tread (TW) to the axial extension of the high elongation belt (CW) is between 1.1 and 1.4;

wherein the tread is manufactured from a rubber compound comprising a cross-linkable unsaturated chain polymeric base comprising at least 50% by weight of natural rubber, a mixture of fillers comprising silica and carbon black and a vulcanization system; and wherein the mixture of fillers comprises:

a carbon black having a surface area of between 99 and 170 $m^2/g$ and with a structure of greater than 120 cc/100 g;

a first silica having a surface area of less than 100 $m^2/g$; and a second silica having a surface area of more than 190 $m^2/g$;

wherein the amount of the first silica and the second silica combined is at least 40% by weight of the filler material.

2. The pneumatic tire of claim 1, wherein the mixture of fillers comprises:

15-40% by weight of the carbon black;

10-35% by weight of the first silica; and 40-80% by weight of the second silica.

3. The pneumatic tire of claim 1, wherein the mixture of fillers comprises:

25-35% by weight of the carbon black;

15-25% by weight of the first silica; and 50-60% by weight of the second silica.

4. The pneumatic tire of claim 1, wherein the carbon black has a surface area of between 120 and 150 $m^2/g$ and with a structure of between 120 and 170 cc/100 g.

5. The pneumatic tire of claim 1, wherein the first silica has a surface area of between 70 and 100 $m^2/g$.

6. The pneumatic tire of claim 1, wherein the second silica has a surface area of between 190 and 250 $m^2/g$.

7. The pneumatic tire of claim 1, comprising four belts of which a second belt starting from the carcass is a first high elongation belt of the at least one high elongation belt.

8. The pneumatic tire of claim 7, wherein the first high elongation belt has a laying angle $\vartheta$ of 0.042 and an axial extension wherein a ratio thereof to the axial extension of the tread is 1.25.

9. The pneumatic tire of claim 1, wherein the at least one high elongation belt has a laying angle ϑ of 0.042 and an axial extension wherein a ratio thereof to the axial extension of the tread is 1.25.

10. The pneumatic tire of claim 1, wherein the high elongation belt is manufactured from RT (Regular Tensile) steel.

11. The pneumatic tire of claim 1, wherein the high elongation belt is manufactured from HT (High Tensile) steel.

12. The pneumatic tire of claim 1, wherein the high elongation belt is manufactured from SHT (Super High Tensile) steel.

13. The pneumatic tire of claim 1, wherein the high elongation belt is manufactured from UHT (Ultra High Tensile) steel.

* * * * *